(12) United States Patent
Chen et al.

(10) Patent No.: US 7,066,201 B2
(45) Date of Patent: Jun. 27, 2006

(54) VALVE DEVICE HAVING SOLID ENGAGING STRUCTURE

(75) Inventors: Jui Chien Chen, Chang Hua (TW); Jui Ching Chen, Chang Hua (TW)

(73) Assignee: Li Kuan Hardware Industrial Co., Ltd., Chang Hua (TW)

( * ) Notice: Subject to any disclaimer, the term of this patent is extended or adjusted under 35 U.S.C. 154(b) by 181 days.

(21) Appl. No.: 10/746,304

(22) Filed: Dec. 24, 2003

(65) Prior Publication Data

US 2005/0139267 A1    Jun. 30, 2005

(51) Int. Cl.
*F16K 15/06* (2006.01)

(52) U.S. Cl. .................................................. 137/541

(58) Field of Classification Search ................ 137/541, 137/542, 543.13, 543; 251/323
See application file for complete search history.

(56) References Cited

U.S. PATENT DOCUMENTS

| | | | | | |
|---|---|---|---|---|---|
| 1,055,437 | A | * | 3/1913 | Aldridge | 137/543.17 |
| 2,787,127 | A | * | 4/1957 | Benz | 137/312 |
| 2,917,077 | A | * | 12/1959 | Ziege | 137/514.7 |
| 2,930,397 | A | * | 3/1960 | Herman | 137/382 |
| 3,035,604 | A | * | 5/1962 | Portis | 137/327 |
| 3,351,081 | A | * | 11/1967 | Bogossian et al. | 137/223 |
| 3,396,743 | A | * | 8/1968 | Mackal et al. | 137/223 |
| 3,590,851 | A | * | 7/1971 | Bogossian et al. | 137/223 |
| 3,800,824 | A | * | 4/1974 | Medina | 137/541 |
| 4,129,145 | A | * | 12/1978 | Wynn | 137/541 |
| 4,176,681 | A | * | 12/1979 | Mackal | 137/516.29 |
| 4,305,425 | A | * | 12/1981 | Mackal et al. | 137/541 |
| 4,368,756 | A | * | 1/1983 | Carlson | 137/541 |
| 4,437,492 | A | * | 3/1984 | Taylor | 137/543.13 |
| 4,633,853 | A | * | 1/1987 | Prill et al. | 122/14.31 |
| 4,674,530 | A | * | 6/1987 | Bickford | 137/469 |
| 4,941,503 | A | * | 7/1990 | Hubner, Jr. | 137/454.2 |
| 5,135,025 | A | * | 8/1992 | Mackal | 137/541 |
| 5,176,171 | A | * | 1/1993 | Andersson | 137/512.1 |
| 5,971,016 | A | * | 10/1999 | Wass et al. | 137/541 |
| 6,183,224 | B1 | * | 2/2001 | Conatser | 417/543 |

* cited by examiner

*Primary Examiner*—Eric Keasel
*Assistant Examiner*—Craig Price
(74) *Attorney, Agent, or Firm*—Alan D. Kamrath; Nikolai & Mersereau, P.A.

(57) ABSTRACT

A valve device includes a housing including a peripheral valve seat extended into a chamber, to separate the chamber into two separated spaces. A valve member includes an outer peripheral groove to receive a sealing ring for engaging with the peripheral valve seat of the housing, to make a seal between the valve member and the peripheral valve seat, and a casing is secured to the valve member. A spring member may bias the casing away from the peripheral valve seat, to force the sealing ring of the valve member against the peripheral valve seat, and to make a fluid tight seal between the valve member and the peripheral valve seat.

2 Claims, 2 Drawing Sheets

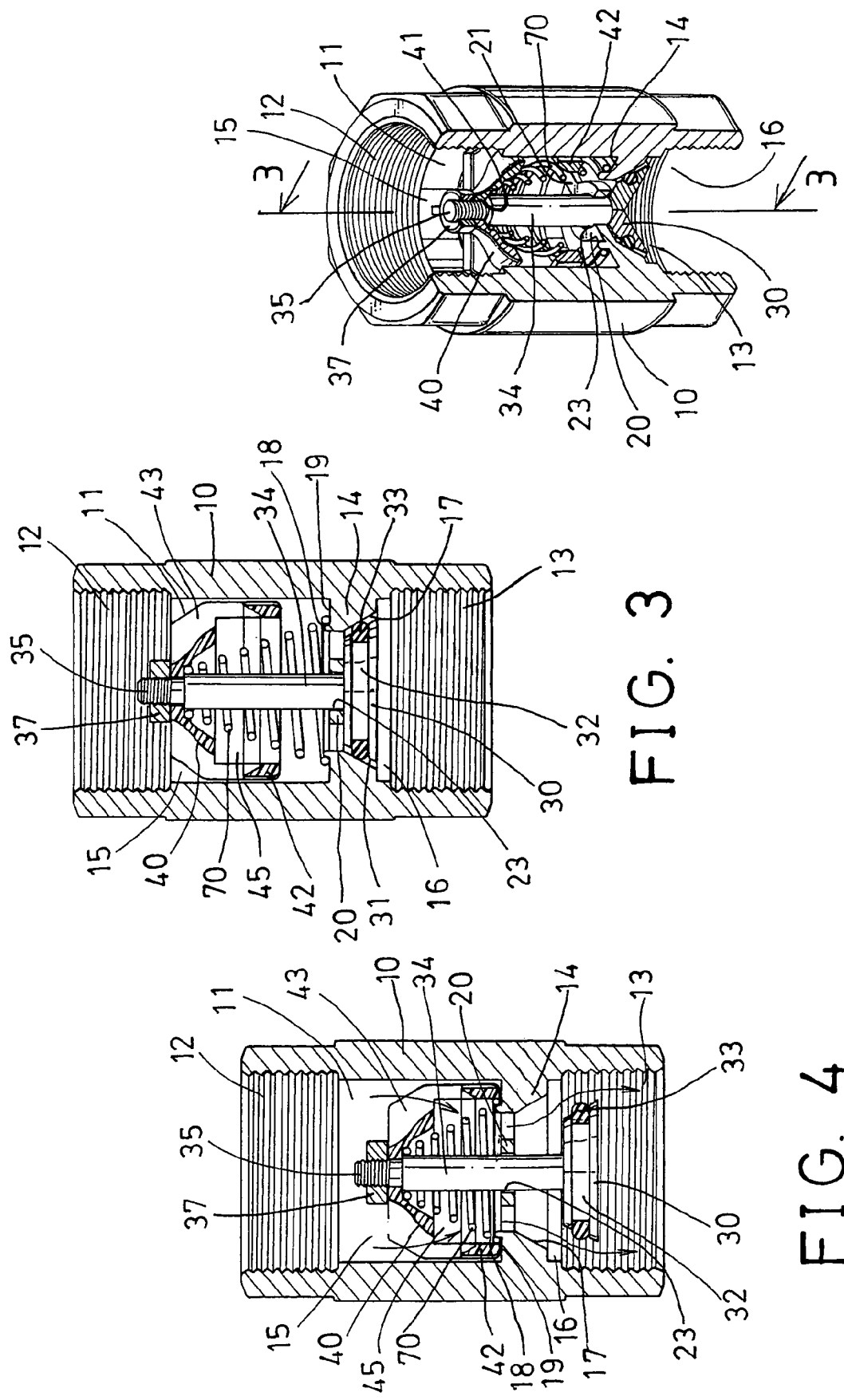

VALVE DEVICE HAVING SOLID ENGAGING STRUCTURE

BACKGROUND OF THE INVENTION

1. Field of the Invention

The present invention relates to a valve device, and more particularly to a valve device, such as a relief valve, a check valve, or the like, having a solid engaging structure for making an air tight or a water tight seal.

2. Description of the Prior Art

Typical air or water flowing systems or facilities are required to install one or more check valves or relief valves therein, for pressure relieving purposes or for controlling the flowing direction of the air or water.

For example, U.S. Pat. No. 1,055,437 to Aldridge discloses one of the typical relief valves for spraying purposes, and comprises a semispherical valve to be rested loosely on a valve seating.

However, the semispherical valve may not be forced to solidly engage with the valve seating, such that the engagement between the semispherical valve and the valve seating may not be formed into a solid air tight or water tight seal or engagement.

The present invention has arisen to mitigate and/or obviate the afore-described disadvantages of the conventional valve devices.

SUMMARY OF THE INVENTION

The primary objective of the present invention is to provide a valve device including a solid engaging structure for making an air tight or a water tight seal.

In accordance with one aspect of the invention, there is provided a valve device comprising a housing including a chamber formed therein, and including a peripheral valve seat extended into the chamber thereof, to separate the chamber thereof into separated first and second spaces, a valve member including an outer peripheral portion having an outer peripheral groove formed therein, and including a shank extended therefrom, a sealing ring received in the peripheral groove of the valve member, for engaging with the peripheral valve seat of the housing, to make a seal between the valve member and the peripheral valve seat, a casing secured to the shank and moved in concert with the shank, the casing including a peripheral fence coupled thereto with at least one coupling link, to form at least one opening between the casing and the peripheral fence, and to allow a fluid to flow through the casing, and a spring member engaged between the housing and the casing, to bias the casing away from the peripheral valve seat of the housing, and to force the sealing ring of the valve member against the peripheral valve seat of the housing, and to make a fluid tight seal between the valve member and the peripheral valve seat of the housing.

The peripheral valve seat includes an inclined peripheral surface formed therein, and facing toward the second space of the housing, for engaging with the sealing ring.

The peripheral valve seat of the housing includes a peripheral rib extended therefrom, to form a peripheral recess therein, and to stably retain the spring member.

The housing includes a ring provided therein, and having a bore formed therein, to slidably receive the shank of the valve member, and to stably guide the shank of the valve member to slide and to move relative to the peripheral valve seat of the housing. The housing includes at least one stay coupled between the peripheral valve seat and the ring, to retain the ring in the housing.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a perspective view of the valve device, in which one quarter of the valve device has been cut off to show the inner structure of the valve device;

FIG. 3 is a cross sectional view of the valve device, taken along lines 3—3 of FIG. 2; and FIG. 4 is a cross sectional view similar to FIG. 3, illustrating the operation of the valve device.

DETAILED DESCRIPTION OF THE PREFERRED EMBODIMENT

Figure 1:
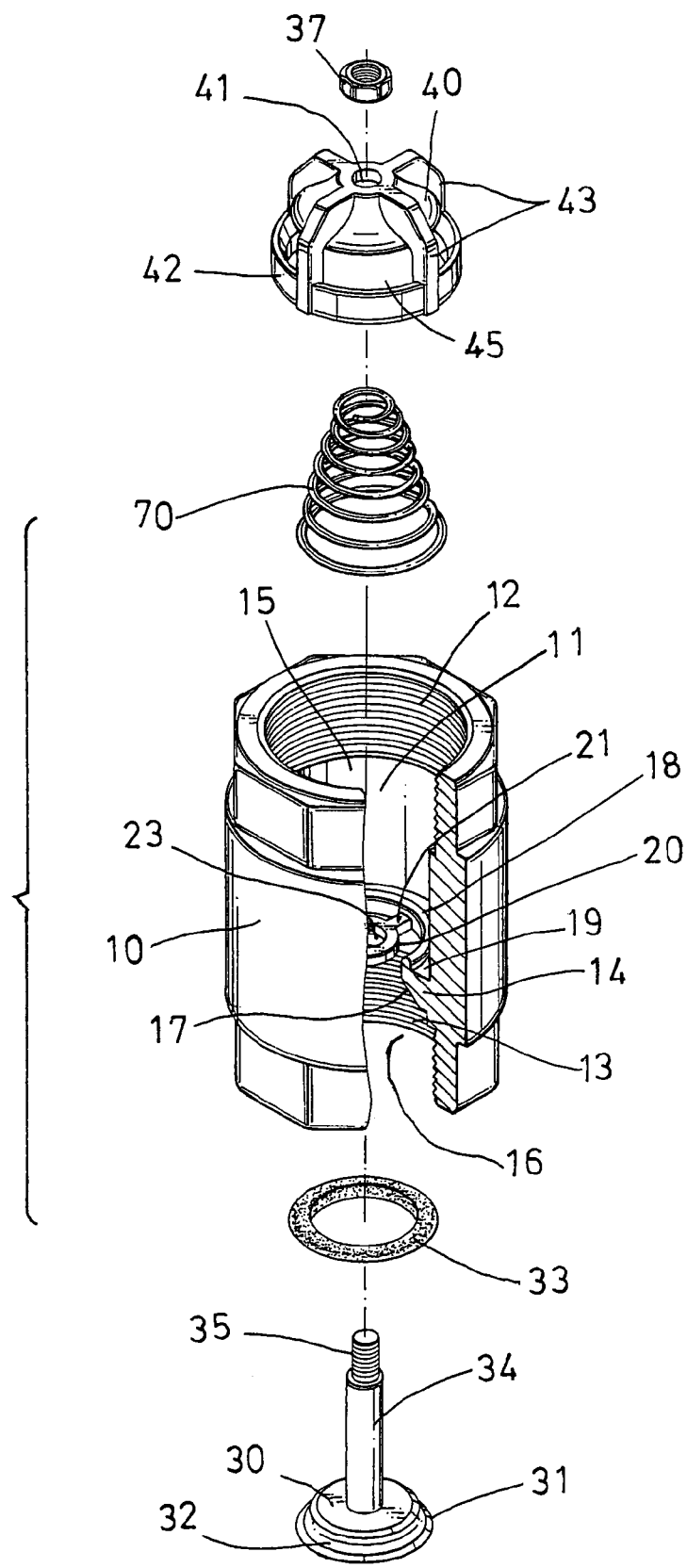
FIG. 1 is an exploded view of a valve device in accordance with the present invention.

Referring to the drawings, and initially to FIGS. 1–3, a valve device in accordance with the present invention comprises a housing 10 including a chamber 11 formed therein, and including two end portions each having an inner thread 12, 13 formed therein, for coupling to various tubings or pipings of various kinds of air or water or fluid flowing systems or facilities (not shown).

The housing 10 includes a peripheral bulge or a peripheral valve seat 14 extended into the middle portion of the chamber 11 thereof, to separate the chamber 11 thereof into two separated spaces 15, 16. The peripheral valve seat 14 includes an inclined or tapered peripheral surface 17 formed therein, and facing toward one of the spaces 15, 16 of the housing 10, such as facing toward the space 16 or the lower portion of the housing 10.

It is preferable that the peripheral valve seat 14 of the housing 10 includes a peripheral rib 18 extended therefrom, such as extended upwardly from an inner peripheral portion thereof, to form or define a peripheral recess 19 therein, for stably seating or retaining a lower portion of a spring member 70, best shown in FIGS. 3 and 4.

The housing 10 further includes a ring 20 disposed in the middle portion of the chamber 11 thereof, and secured to the housing 10 or to the peripheral valve seat 14 of the housing 10 with one or more stays 21. The ring 20 includes a bore 23 formed therein.

A valve member 30 includes an inclined or tapered outer peripheral surface 31 formed thereon and preferably having an inclination corresponding to that of the inclined or tapered peripheral surface 17 of the peripheral valve seat 14 of the housing 10, for allowing the valve member 30 to be solidly or effectively engaged with the inclined or tapered peripheral surface 17 of the peripheral valve seat 14 of the housing 10.

The valve member 30 further includes an outer peripheral groove 32 formed therein, to receive a sealing ring 33 which may be forced or caused to solidly or effectively engage with the inclined or tapered peripheral surface 17 of the peripheral valve seat 14 of the housing 10, in order to make a solid engaging structure or to make a solid air tight or water tight or fluid tight seal between the valve member 30 and the peripheral valve seat 14 of the housing 10 (FIG. 3).

The valve member 30 further includes a shank 34 extended therefrom, and slidably extended through the bore 23 of the ring 20, and extended through the spring member 70, to allow the shank 34 and thus the valve member 30 to be stably guided to slide relative to the peripheral valve seat 14 of the housing 10. The shank 34 further includes an outer thread 35 formed thereon, for threading with a fastener or a lock nut 37 or the like.

A casing 40 includes an orifice 41 formed therein for receiving the shank 34, and arranged to allow the casing 40 to be secured to the shank 34 with the lock nut 37, and thus to allow the casing 40 to be moved in concert with the shank 34. The casing 40 includes a peripheral fence 42 spaced therefrom and coupled thereto with one or more coupling links 43, to form or define one or more openings 45 in the casing 40 or between the casing and the peripheral fence 42, and to allow the air or water or fluid to flow through the casing 40.

The spring member 70 is engaged between the peripheral valve seat 14 or the housing 10 and the casing 40, to move or bias the casing 40 away from the peripheral valve seat 14 of the housing 10, best shown in FIG. 3, and thus to force the sealing ring 33 or the valve member 30 against the inclined or tapered peripheral surface 17 of the peripheral valve seat 14 of the housing 10, and to make the air tight or water tight or fluid tight seal or engagement between the valve member 30 and the peripheral valve seat 14 of the housing 10.

As shown in FIG. 4, when the air or water or fluid, from the space 15 of the housing, flows through the openings 45 of the casing 40, and when the air or water or fluid apply a force, against the valve member 30, good enough to overcome the spring biasing force of the spring member 70, the air or water or fluid may force or move the valve member 30 away from the peripheral valve seat 14 of the housing 10, to allow the air or water to flow through the valve seat 14 and to flow out through the other space 16 of the housing 10.

When the force of the air or water applied against the valve member 30 is not good enough to overcome the spring biasing force of the spring member 70, the spring member 70 may bias the casing 40 away from the peripheral valve seat 14 and to force the sealing ring 33 or the valve member 30 against the peripheral valve seat 14 again, and to make the solid air tight or water tight seal or engagement between the valve member 30 and the peripheral valve seat 14 of the housing 10 again.

Accordingly, the valve device in accordance with the present invention includes a solid engaging structure for making an air tight or a water tight seal between the valve member and the valve seat.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

The invention claimed is:

1. A valve device comprising:
   a housing including a chamber formed therein, and including a peripheral valve seat extended into said chamber thereof, to separate said chamber thereof into separated first and second spaces, said peripheral valve seat of said housing including a peripheral rib extended therefrom to form a peripheral recess therein, said housing including a ring provided therein and having a bore formed therein wherein said ring is connected to said housing at said rib, and including at least one stay coupled between said peripheral valve seat and said ring to retain said ring in said housing,
   a valve member including an outer peripheral portion having an outer peripheral groove formed therein, and including a shank extended therefrom and slidably received in said bore of said ring which stably guide said shank of said valve member to slide and to move relative to said peripheral valve seat of said housing,
   a sealing ring received in said peripheral groove of said valve member, for engaging with said peripheral valve seat of said housing, to make a seal between said valve member and said peripheral valve seat,
   a casing secured to said shank and moved in concert with said shank, said casing including a peripheral fence coupled thereto with at least one coupling link, to form at least one opening between said casing and said peripheral fence, and to allow a fluid to flow through said casing, and
   a spring member engaged between said housing and said casing, to bias said casing away from said peripheral valve seat of said housing, and to force said sealing ring of said valve member against said peripheral valve seat of said housing, and to make a fluid tight seal between said valve member and said peripheral valve seat of said housing, said spring member being stably retained in said peripheral recess of said peripheral valve seat of said housing.

2. The valve device as claimed in claim 1, wherein said peripheral valve seat includes an inclined peripheral surface formed therein, and facing toward said second space of said housing, for engaging with said sealing ring.

* * * * *